United States Patent [19] [11] Patent Number: 4,893,261
Flint, III et al. [45] Date of Patent: Jan. 9, 1990

[54] APPARATUS AND METHOD FOR DETERMINING AIRSPEED AND DIRECTION

[75] Inventors: William W. Flint, III, West Hartford; Richard C. Filipkowski, Glastonbury, both of Conn.

[73] Assignee: United Technologies Corporation, Hartford, Conn.

[21] Appl. No.: 123,421

[22] Filed: Nov. 20, 1987

[51] Int. Cl.⁴ .................................................. G01C 21/00
[52] U.S. Cl. ..................................... 364/565; 73/182; 73/178 H; 416/31; 244/17.13
[58] Field of Search ................. 73/182, 178 H, 178 R; 364/440, 565; 416/31; 244/17.13

[56] References Cited

U.S. PATENT DOCUMENTS 3,332,282 7/1967 Daw ...................................... 73/182
4,360,888 11/1982 Onksen et al. ........................ 73/182
4,519,743 5/1985 Ham ...................................... 416/31

Primary Examiner—Thomas H. Tarcza
Assistant Examiner—David Cain
Attorney, Agent, or Firm—Francis J. Maguire, Jr.

[57] ABSTRACT

Aircraft speed and direction are determined by sampling the sinusoid-like pressure variations at the end of a rotor and performing a Fourier analysis on the pressure samples. Fourier quadrature component signals are used to determine aircraft direction and are also used to determine, along with a steady state component, the aircraft's total velocity. A discrete Fourier analysis may be performed on the pressure samples using a plurality of subrevolution pressure samples averaged over each subrevolution interval.

16 Claims, 6 Drawing Sheets

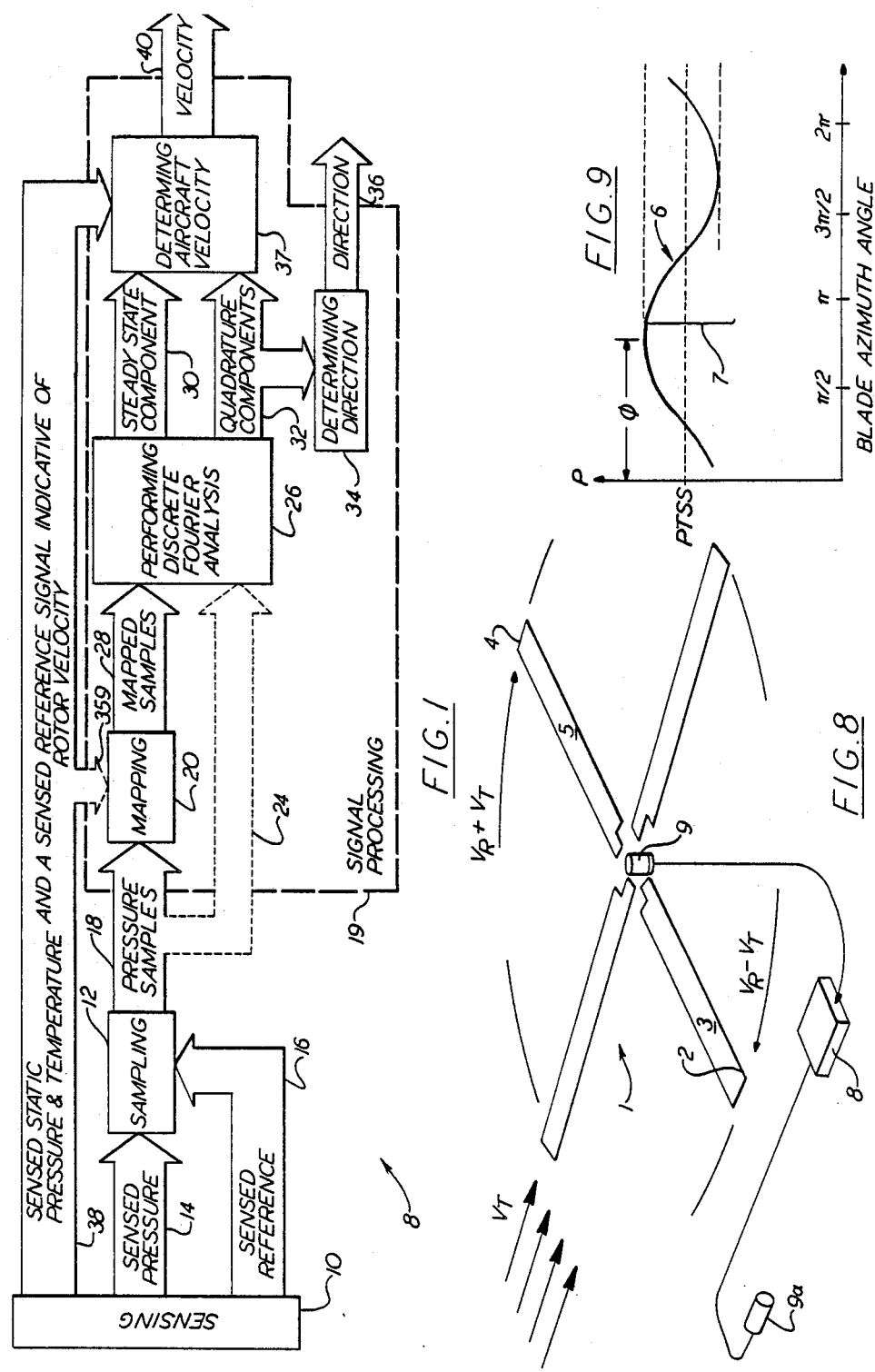

APPARATUS AND METHOD FOR DETERMINING AIRSPEED AND DIRECTION

TECHNICAL FIELD

The present invention relates to a method and means for determining the airspeed and direction of an aircraft and, more particularly, means and method for determining airspeed and direction by interpreting a signal indicative of pressure variations at the end of a rotating member.

BACKGROUND ART

It is known in the art of sensing aircraft speed and direction to place a pressure sensor at the end of a rotating arm and to interpret the pressure variations which occur as a result of aircraft movement through an air mass so as to provide airspeed and direction signals. See, for example, U.S. Pat. No. 4,360,888 to Onksen et al and U.S. Pat. No. 3,332,282 to D. F. Daw.

Daw's airspeed indicator is restricted to helicopters. He places a pressure sensing probe at the tip of one of the helicopter rotor blades. As the blade rotates, the amplitude of the cyclic variation of the blade tip pressure per revolution is a function of the translational speed of the helicopter. The cyclic variation is converted into an electrical signal which is passed through an inductive coupling using a pair of strategically positioned cored coils. By positioning the coils at right angles with respect to one another and in a known position with respect to the longitudinal axis of the aircraft, any component of the translational speed may be determined, and, from component measurements, the resultant translational direction with respect to the aircraft's axis may be derived. Daw's method is particularly advantageous in helicopters which do not have slip rings, many types of helicopters not being furnished therewith.

Onksen's omni-directional airspeed system calculates airspeed from a differential pressure signal indicative of the pressure difference between two rotating pitot-type sensors which are mounted at the ends of hollow tubular arms. At airspeeds other than zero, according to Onksen, the velocity of the air through the sensors varies sinusoidally, with maximum difference when the sensor arms are aligned perpendicular to the wind. At that instant the velocity of the sensor advancing into the wind is equal to the tip speed plus the airspeed, and the velocity of the wind in the sensor retreating from the wind is equal to the tip speed minus the airspeed. The resultant pressures in the two hollow tubes are then different, and the transducer outputs a voltage proportional to the differential pressure and proportional to the total speed. At the instant the arms are aligned parallel to the wind, the wind velocity in the sensors are again equal and the differential pressure transducer outputs zero. As mentioned, the resultant voltage waveform from the differential transducer is a sinusoid, according to Onksen, with amplitude related to airspeed and phase related to relative direction of the wind. Onksen et al provides a phase reference to resolve the airspeed signal into the longitudinal and lateral components.

Daw's placement of his pick-up coils automatically serves this reference function.

Both Onksen et al and Daw, in effect, assume that the pressure at the end of the rotating arm is a pure sinusoid. Other rotating pressure sensing devices are disclosed by Beilman in U.S. Pat. Nos. 3,400,584; 3,726,139; 4,065,957 and 4,074,570.

DISCLOSURE OF INVENTION

An object of the present invention is to provide a means and method for providing an airspeed signal indicative of an aircraft's velocity relative to an air mass.

Another object of the present invention is to provide a direction signal indicative of the aircraft's direction in the airmass relative to a frame of reference fixed in the aircraft.

According to the present invention, the magnitude of a sensed pressure signal indicative of pressure at an end of a rotating member is selectively sampled during each of a plurality of subrevolutions within each revolution of the rotating member. A sensed periodic reference signal is provided to indicate the position of the rotating member with respect to a reference position relative to a frame of reference fixed in the aircraft. This enables an accurate determination of the subrevolution intervals by referencing the selected samples to the reference signal. The sampling means provides sampled signals having magnitudes indicative of the magnitude of the sensed pressure signal during each of the plurality of subrevolution intervals. A discrete Fourier series analysis is performed by weighting each of the sampled signals for each of the corresponding plurality of subrevolution intervals. The weighting may be carried out in order to resolve any of the harmonics less than or equal to the Nyquist rate, but the first harmonic alone is sufficient. The resulting steady state component signals and quadrature component signals are summed over a selected number of revolutions, typically one revolution. The summed quadrature component signals may be used to determine the direction of the aircraft relative to the frame of reference. An airspeed signal having a magnitude indicative of the aircraft's velocity relative to the air mass is provided as a function of the magnitudes of the summed steady state signal, a resultant signal indicative of the resultant of the quadrature component signals, a signal indicative of rotating member velocity and a sensed static pressure signal indicative of static pressure outside the aircraft.

In further accord with the present invention, the sensed signal indicative of pressure at the end of the rotating member is a periodic signal having a frequency much greater than that of the rotating member. The sensed signal is frequency modulated by virtue of and in proportion to pressure variations occurring in response to motion of the aircraft relative to the air mass. In one embodiment, the sampling means comprises means for determining the average frequency of the frequency modulated sensed signal during each of the plurality of subrevolution intervals and provides, for each subrevolution interval, an average frequency signal having a magnitude indicative thereof. One way of doing this is to count the number of cycles of the frequency modulated sensed signals to occur during each of the plurality of subrevolution intervals and to provide a pressure cycles count signal indicative of the number of cycles counted. A fixed frequency reference signal can then be counted out, also during each of the plurality of subrevolution intervals, to obtain a clock cycles count signal. The magnitude of the pressure cycles count signal can then be divided by the magnitude of the clock cycles count signal for each of the plurality of subrevolution intervals. A quotient signal is then provided indicating the magnitude of the quotient between the pressure cycles count signal and the clock cycle count signal. The magnitude of the quotient signal is then multiplied by a clock frequency signal having a magnitude indicative of the fixed frequency of the reference signal. An average frequency signal having a magnitude indicative of the product of the quotient signal and the clock frequency signal thus indicates the average frequency of the frequency modulated sensed signal.

In still further accord with the present invention, the Fourier series resultant signal is provided by separately squaring the magnitudes of the summed quadrature Fourier component signals and providing a pair of squared signals having magnitudes indicative thereof, summing the squared signals and providing a summed squared signal having magnitudes indicative thereof, and taking the square root of the summed squared signal and providing a square root signal as a resultant signal having a magnitude indicative of the magnitude of the Fourier series first harmonic of the time varying portion of the sensed, periodic and frequency modulated signal.

In still further accord with the present invention, the airspeed signal is provided by dividing the magnitude of the summed steady state Fourier component signal by the magnitude of the sensed static pressure signal and providing a ratio signal having a magnitude indicative of the quotient therebetween; raising the ratio signal to the two-seventh power and providing a two-seventh root signal indicative of the magnitude thereof; multiplying the magnitude of a sensed static temperature signal by the magnitude of the Fourier first harmonic resultant signal and providing a product signal having a magnitude indicative thereof; dividing the magnitude of the product signal by the magnitude of the summed steady state Fourier component signal and the signal indicative of rotating member velocity and providing a quotient signal having a magnitude indicative thereof; and, multiplying the magnitude of the quotient signal by a constant signal magnitude and by the two-seventh root signal and providing as the product therebetween the airspeed signal having a magnitude indicative of the aircraft's velocity relative to the air mass.

In still further accord with the present invention, the first harmonic resultant signal is corrected by a factor of $[(m/\pi)\sin(\pi/m)]^2$, where m equals the number of subrevolution intervals.

In still further accord with the present invention, for helicopter embodiments, a pressure sensor is mounted on the tip of the main rotor. The total pressure at the rotor tip during a hover has a constant value that is much greater that the static pressure. This is due to the high velocity of the rotor tip and ameliorates the problem of the prior art in which difficulties were encountered because of very small impact pressure at low speeds.

The present invention, in recognizing and taking account of the fact that the pressure measured at the end of the rotating member is only approximately a sinusoid, and by performing a Fourier analysis on the pressure signal, permits more accurate determinations of airspeed and direction. Furthermore, by taking into account the fact that the average value of pressure also varies with airspeed, non-linear distortions of the quasi-"sinusoid" can be removed. The approach disclosed for one embodiment is a discretization of standard Fourier analysis using discrete components selected according to rotor angle rather than time.

In addition, rather than instantaneously sampling pressure at the tip, accuracy may be improved by utilizing a pressure measuring technique in which the average value of tip pressure measured during each of a plurality of subrevolutions of the rotating member is provided. The sampling technique reduces aliasing effects by using samples which are average pressures rather than instantaneous samples. A correction factor is applied to correct for errors made in the determination of the average value of the input pressure signal. In addition, aliasing of higher harmonics due to the nonlinearization of the "sinusoid" is predictable to a high degree of accuracy, i.e., the aliasing has a gain effect on the first harmonic which may be corrected.

A binomial expansion of Bernoulli's equation of compressible flow may be used to produce an approximating equation relating the first harmonic and the steady state Fourier component to airspeed. Or, an exact solution may be utilized.

Thus, according to the present invention, an airspeed and direction measurement system is provided which provides high accuracies over a very wide range of speeds. The types of components used permits reduction in size, weight and power, reduces costs and provides a higher level of electronic integration then ever previously achieved.

Moreover, the airspeed system of the present invention helps the pilot to fly within a safe flight envelope, shortens the take-off and landing distances, adds more capability to auto flight control systems and helps the pilot in low speed maneuvers such as: (1) nap of the of the earth flying, (2) hover in wind conditions, (3) take-off and landing in poor visibility conditions and (4) weapons launch.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1 is a simplified block diagram illustration of a number of steps which may be carried out, according to the present invention, for determining aircraft velocity and direction from a pressure signal indicative of the pressure at the end of a rotating member;

FIG. 8 is a stylized illustration of a helicopter rotor rotating in an air mass upon a helicopter fuselage (not shown) which is in motion relative to an air mass;

FIG. 9 is a plot of pressure variation sensed at the tip of a rotating member.

BEST MODE FOR CARRYING OUT THE INVENTION

Figure 6:
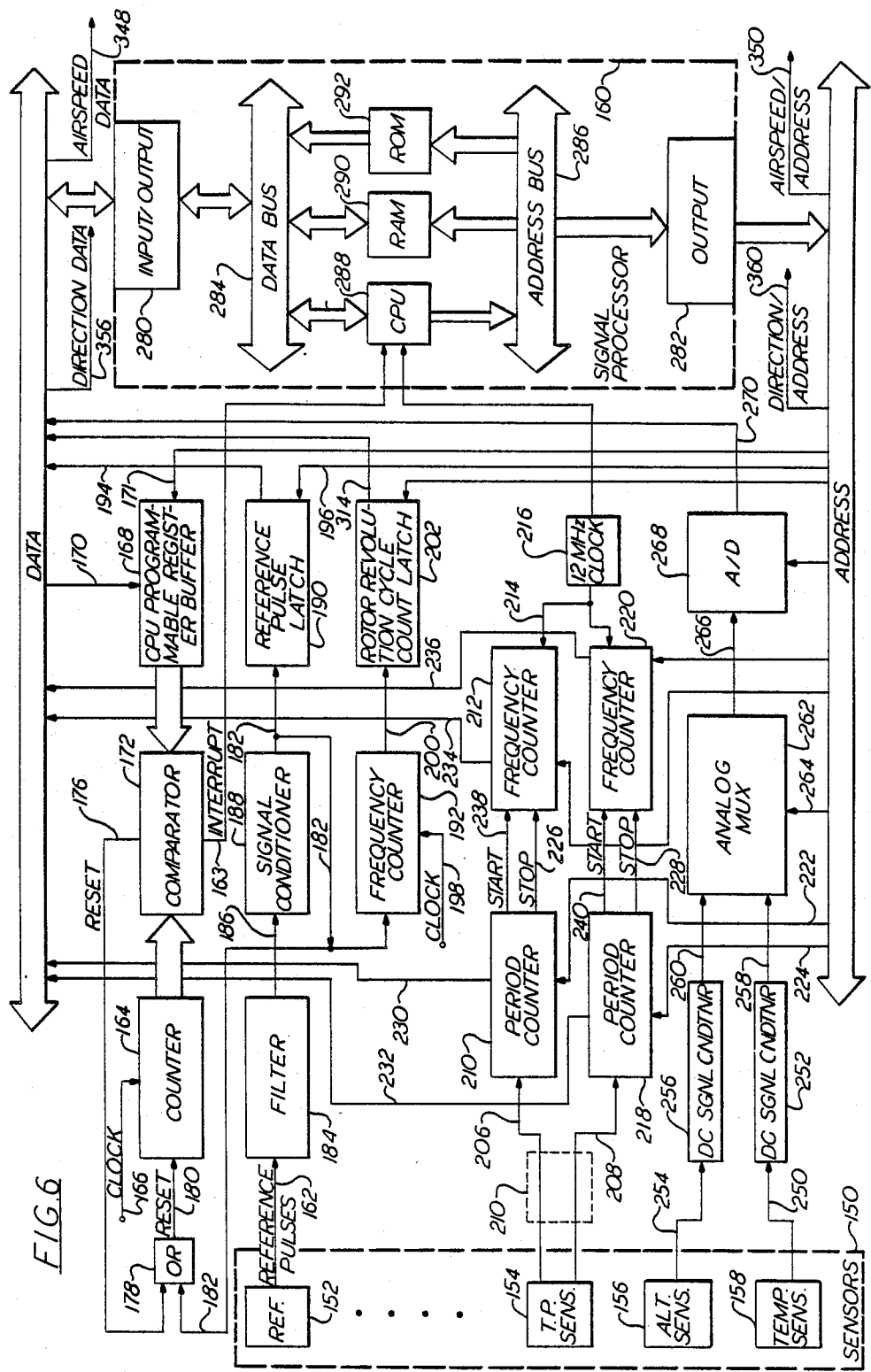
FIG. 6 is a simplified block diagram illustration of hardware which might be utilized in carrying out the sensing, sampling and signal processing steps of FIG. 1.

FIG. 1 is a simplified block diagram illustration of an example of a method, carried out by means of an apparatus as shown in the embodiment of FIG. 6, according to the present invention, for determining aircraft velocity and direction from a sensed pressure signal indicative of the pressure at the end of a rotating member. The rotating member may, without limitation, be a motor driven shaft having a pair of whirling symmetrical arms extending perpendicularly therefrom as shown in U.S. Pat. No. 4,360,888. Or, again without limitation, a pressure sensor may be placed at the end of a helicopter blade such as is shown in U.S. Pat. No. 3,332,282. FIG. 8 is an illustration of a helicopter rotor 1 rotating at a given speed, e.g. and without limitation, 5 RPM in a counterclockwise direction, as viewed from above. The helicopter to which the rotor is attached is moving within and with respect to an air mass at a velocity $V_T$ as manifested by a "wind" advancing in the direction shown. If one were to measure the pressure at a tip 2 of a blade 3, one would obtain a pressure reading (PTSS) proportional to the steady state velocity of the rotor (5 RPM) minus the velocity of the aircraft ($V_T$). On the other hand, if one were to measure the pressure at a tip 4 at the end of an opposing rotor blade 5, one would measure a pressure proportional to the steady state speed of the rotor plus the aircraft velocity relative to the air mass.

Figure 5:
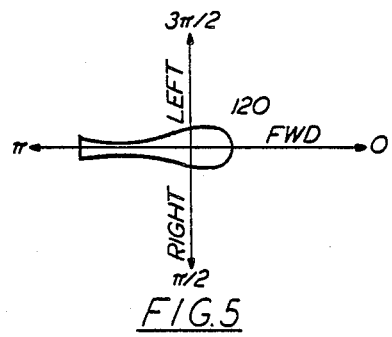
FIG. 5 is an illustration showing a coordinate system fixed in an aircraft, which coordinate system may be used to interpret FIG. 4.

This is illustrated in FIG. 9 which shows a plot of blade azimuth angle on the abcsissa and the pressure at a blade tip on the ordinate. There, an idealized waveform 6 has an amplitude 7 indicative of airspeed with respect to the air mass. A phase angle ($\phi$) is indicative of the relative heading of the aircraft in the air mass with respect to a frame of reference fixed in the aircraft. FIG. 5 shows a top view of a helicopter in which a coordinate system is fixed, showing the relationship of the blade azimuth angle shown on the abcsissa of FIG. 9 with respect to axes fixed in the aircraft.

Referring back to FIG. 8, a combined signal processor and sampling unit 8 receives sensed pressure signals from slip rings 9 which are connected to at least one pressure sensor (not shown) at the tip of one of the blades. The sensors may be of the capacitive pressure sensor type such as are disclosed in U.S. Pat. Nos. 4,405,970 to Swindal et al, 4,415,948 to Grantham et al, 4,467,394 to Grantham et al, 4,517,622 to Male, and 4,530,029 to Beristain or may be any type of sensor known in the art of pressure sensing. A display 9a is provided for the pilot.

In any event, referring back to FIG. 1, a number of parameters, including pressure, are sensed in a step 10 and signals having magnitudes indicative of the magnitudes of the sensed parameters are provided. These may be sampled, as indicated by a sampling step 12. Or, they may be provided for use in other steps to be utilized subsequent to sampling. A sensed pressure signal 14 such as would be provided from a pressure sensor at the end of the rotating member is provided on line 14. This signal will be a quasi-sinusoid whose amplitude will increase with increasing aircraft velocity relative to an air mass through which the aircraft is proceeding, as suggested in FIGS. 8 & 9. For zero velocity with respect to the air mass, as in a hovering helicopter, the quasi-sinusoid has zero amplitude and a steady state value (PTSS) due to the rotation of the rotating member with respect to the air mass which is greater than the static pressure.

Pressure samples are taken several times per revolution of the rotating member and pressure signals are provided on a line 18. These samples then undergo a signal processing step 19. A mapping step 20 is illustrated within the signal processing step 22 although, in the broadest embodiment of the invention, such a mapping step 20 may not present as suggested by a signal line 24 provided in lieu of step 20, or may instead be thought of as performing a simple linear operation on the signals on line 18 prior to being provided to a Fourier analysis step 26. It may thus be desirable to have a mapping step 20 perform certain nonlinear operations on the pressure samples on line 18 prior to performing the discrete Fourier analysis in step 26. Thus, mapped sample signals may be provided, without limitation, on a line 28, and the discrete Fourier analysis may then be performed on these mapped samples.

Various functions may be performed in the mapping step 20. This may include a two-sevenths root mapping step for implementing an exact solution of Bernoulli's equation of compressible flow, to be disclosed in more detail below. On the other hand, the mapping step may simply be left out, so that the signals on line 18 are the same as, or, if scaled, essentially the same as, those on line 28. In any event, whether the pressure samples on line 18 are mapped in step 20 or not, a discrete Fourier analysis is performed on the pressure samples in the step 26 in which the result is to provide a steady state component signal on a line 30 and a pair of quadrature component signals on a line 32.

It will be understood that other types of analysis, yielding similar component signals may be performed in step 26 in lieu of Fourier analysis.

In any event, the pair of quadrature component signals on line 32 are provided individually for determining aircraft direction relative to the air mass with respect to a frame of reference fixed in the aircraft, as shown in a step 34. A direction signal on a line 36 is provided as an output of the signal processing step 19.

The quadrature component signals on line 32 are also provided, along with the steady state component signal on line 30, for determining aircraft velocity relative to the air mass. This may be accomplished in a step 37 by means of a binomial expansion of Bernoulli's equation of compressible flow, constituting an approximating equation relating the resultant of the two quadrature components, the steady state component, static temperature and static pressure, to obtain velocity. One or both sensed static pressure and temperature signals on a line 38 may be utilized at this step. The result of the determination of step 37 is to provide a velocity signal on a line 40 having a magnitude indicative of the aircraft's velocity with respect to the air mass.

In the sampling step 12, the output of a pressure sensor mounted at the rotating arm's tip is sampled during intervals within each revolution of the rotating arm. For example, the pressure may be sampled during every $\pi/8$ radian of rotating arm motion. (This is not to say that the sample intervals must be equal in angle). This results in sixteen samples per revolution. The output from one of these samples may, for example, be the average pressure measured during that particular $\pi/8$ radian of motion. Or, it may, for example, be instantaneous. A discrete Fourier analysis performed in step 26 on a plurality of pressure samples over a complete revolution gives the steady state component on line 30 and the quadrature components on line 32. These signals are used, as described in more detail below, in determining aircraft velocity in step 37. As also explained in more detail below, airspeed azimuth is determined in a step 34 from the arctangent of the ratio of the two quadrature components (the sine and cosine coefficients).

As known in the art of signal analysis, a periodic function f(x) can be represented as follows:

$$f(x) = a_o + \sum_{n=1}^{\infty} [a_n \cos(nx) + b_n \sin(nx)] \quad (1)$$

where:

$$a_o = 1/2\pi \int_{-\pi}^{\pi} f(x) dx \quad (2)$$

$$a_n = 1/\pi \int_{-\pi}^{\pi} f(x) \cos(nx) dx \quad (3)$$

$$b_n = 1/\pi \int_{-\pi}^{\pi} f(x) \sin(nx) dx \quad (4)$$

Any singled value function f(x), continuous except possibly for a finite number of discontinuities in any individual length of $2\pi$, and having a finite number of maxima and minima in this interval possesses a convergent Fourier series representing it, as described in the above equations.

According to the present invention, harmonics occurring at multiples of the frequency of rotation of the rotating member are related to airspeed but the first harmonic and the steady state components contain most of the useful airspeed information. An embodiment of the present invention to be described below (in which the pressure samples represent average pressure over a subrevolution interval) makes use of this fact in the disclosed algorithm, which is used to determine airspeed. The algorithm generally achieves a Fourier series representation of the input pressure signal by a discrete Fourier series. If $PT_j$ represents the jth sample after the reference pulse and m is the number of pressure samples per blade revolution, then $$a_o = PTSS = 1/m \sum_{j=1}^{m} PT_j \quad (5)$$

$$a_1 = A1 = 1/\pi \sum_{j=1}^{m} PT_j[\sin(j2\pi/m) - \sin((2\pi/m)(j-1))] \quad (6)$$

$$b_1 = B1 = 1/\pi \sum_{j=1}^{m} PT_j[\cos((2\pi/m)(j-1)) - \cos(j2\pi/m)] \quad (7)$$

$$\text{and } PT1 = FFF\ (A1^2 + B1^2)^{\frac{1}{2}} \quad (8)$$

where the correction factor (FFF) is approximately $[(m/\pi)\sin(\pi/m)]^2$. The aliasing of higher harmonics due to the non-linearization of the sine wave is predictable to a high degree of accuracy. The actual valve of FFF may be adjusted to correct for these aliasing effects.

The Fourier algorithm itself is insensitive to error due to the influence of higher harmonics unless the harmonics are high enough to alias as the first harmonic. Such aliasing effects are reduced by using a sampling technique which effectively functions as a first order lag with a break frequency equal to the rotor frequency. This technique may be implemented over a number of equally sized adjacent samples over at least one revolution. These samples are average pressures over each entire sample interval rather than using instantaneous samples.

Figure 11:
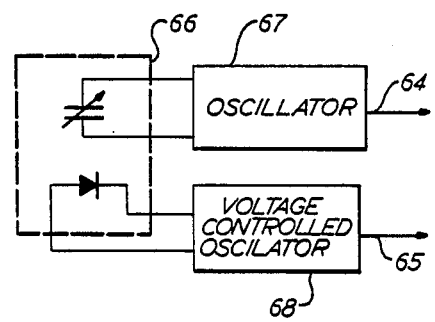

For the typical hardware embodiments shown in this disclosure, there will typically be two periodic signals shown, for example in FIG. 11, on lines 64, 65 output by a pressure transducer 66. The signal on line 64 has its frequency proportional to both pressure and transducer temperature. This is due to the fact that a typical capacitive pressure transducer such as a semiconductor diaphragm type, is affected by both temperature and pressure. Such a transducer is typically placed in the tank circuit of an oscillator whose resonant frequency changes according to changes in the capacitance, in turn caused by changes in sensed pressure. The other signal on line 65 has frequency proportional solely to transducer temperature. This signal is called the "temperature frequency" and may be derived from a voltage controlled oscillator 68 controlled by a temperature sensor. The temperature frequency is used to compensate the pressure frequency for temperature effects. After compensation the pressure frequency will be a function solely of pressure.

Figure 2:
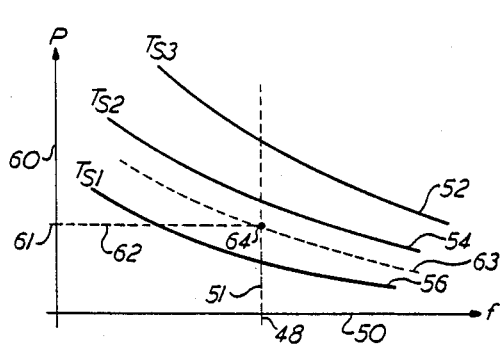
FIG. 2 is an illustration of a bivariate map showing the non-linarities of a pressure sensor with respect to frequency and temperature.

As known in the art of sensing, sensors are typically non-linear over a given range of interest. Therefore, a mapping function may be performed in step 20 of FIG. 1 which may accomplish, among other things, linearization of sensed signals from such non-linear sensors. It may also include, among other things, an interpolation function such as is illustrated in FIG. 2. If the sensed pressure is manifested by means of a high frequency periodic signal whose frequency is modulated in such a way as to in fact indicative of sensed pressure at the tip of the rotating member, as shown for one instantaneous or average frequency 48 in FIG. 2 on an abcsissa 50, pressure will be determined according to the intersection of a vertical line 51 with one of a plurality of curves 52, 54, 56 as read off an ordinate 60 at an intersection 61 of a horizontal line 62 with the ordinate. The plurality of curves 52, 54, 56 correspond to different discrete temperatures of the air mass. The map shown in FIG. 2 is thus a "bivariate" map in which information on a finite number of curves is stored, one for each of a number of selected temperatures which may be sensed. Numerical values representing the various points on each of the curves 52, 54, 56, represented in solid lines and corresponding to temperatures $T_{S1}$, $T_{S2}$ & $T_{S3}$ may thus be stored in a memory storage unit within a signal processor. The mapping function 20 interpolates, for example, for a sensed temperature midway between $T_{S1}$ & $T_{S2}$, the curve 63 shown in dashed lines. Thus, a point 64 is an interpolation.

In order to simplify the following explanation it is assumed that only one sensor signal whose frequency is proportional only to pressure is provided. Thus, using this assumption, the total pressure at the tip of the rotating member is indicated by the frequency of the sensor output (the pressure frequency).

The sampling process consists of counting rising (or falling) edges of a periodic signal whose frequency is proportional to pressure while simultaneously counting rising (or falling) edges of a high frequency clock (whose frequency is fixed). The frequency of the pressure signal is then equal to the known clock frequency times a ratio obtained by dividing the number of pressure cycles counted by the number of clock cycles counted over the interval of interest. This sampling process produces a measurement of pressure frequency which is equal to the average frequency of the pressure signal over the finite time interval of sampling.

The actual pressure of the waveform 6 of FIG. 9 has a frequency equal to the frequency of the main rotor. This frequency is different from the "pressure frequency" which is the high frequency pressure pulses output from the oscillator 67 of FIG. 11 which frequency has an instantaneous value indicative of instantaneous pressure seen by the transducer 66. Thus, the pressure variations sensed at the tip of the rotating member are used to frequency modulate the frequency of the tank circuit in the oscillator 67.

The harmonics referred to herein refer to harmonics of the periodic pressure seen at the tip of the rotating member. When airspeed is non-zero this pressure takes on the form of a distorted sine wave whose fundamental frequency is equal to the frequency of rotation of the rotating member. The fact that the sine wave is distorted means that it will contain harmonics of the fundamental (rotating member) frequency. Some of these harmonics will alias in the sampling process and alter the amplitude of the fundamental. According to the present invention, these aliasing harmonics are attenuated in the sampling process by the first order lag effect described previously.

In the general case, there are m samples of pressure taken over one revolution of the rotating member. A given pressure sample is taken over $2\pi/m$ radians of rotor rotation (one sample window). This results in a pressure sample which is the average of the pressure seen by the transducer during that $2\pi/m$ radians of rotor rotation. At the end of the given sample window the sampling process is stopped, the data read, and sampling immediately started again for the next sample window.

The fact that the sampling process averages the pressure seen at the tip of the rotating member over the entire sample window means that the harmonics of interest (those harmonics which alias as the fundamental) are attenuated by a factor of $1/n$, where n is the harmonic index. For example, at a sample rate of m=16 samples per revolution, the 15th harmonic will alias as the fundamental. But after the sampling process, the 15th harmonic will be fifteen times smaller that it was before sampling. This says that harmonics which alias as the fundamental are attenuated by a factor of $1/n$, where n is the aliasing harmonic. But $1/n$ is the attenuation factor of a first order low pass filter (frequency normalized to the fundamental). Thus, the method of sampling shown herein functions as a first order low pass anti-alias filter to all aliasing harmonics of any consequence. In addition, the aliasing harmonics may be further attenuated by increasing the sample rate. This occurs because increasing the sample rate increases the frequency of the harmonics which alias as the fundamental, thereby placing them further into the region of attenuation of the anti-alias sampling technique.

Figure 3:
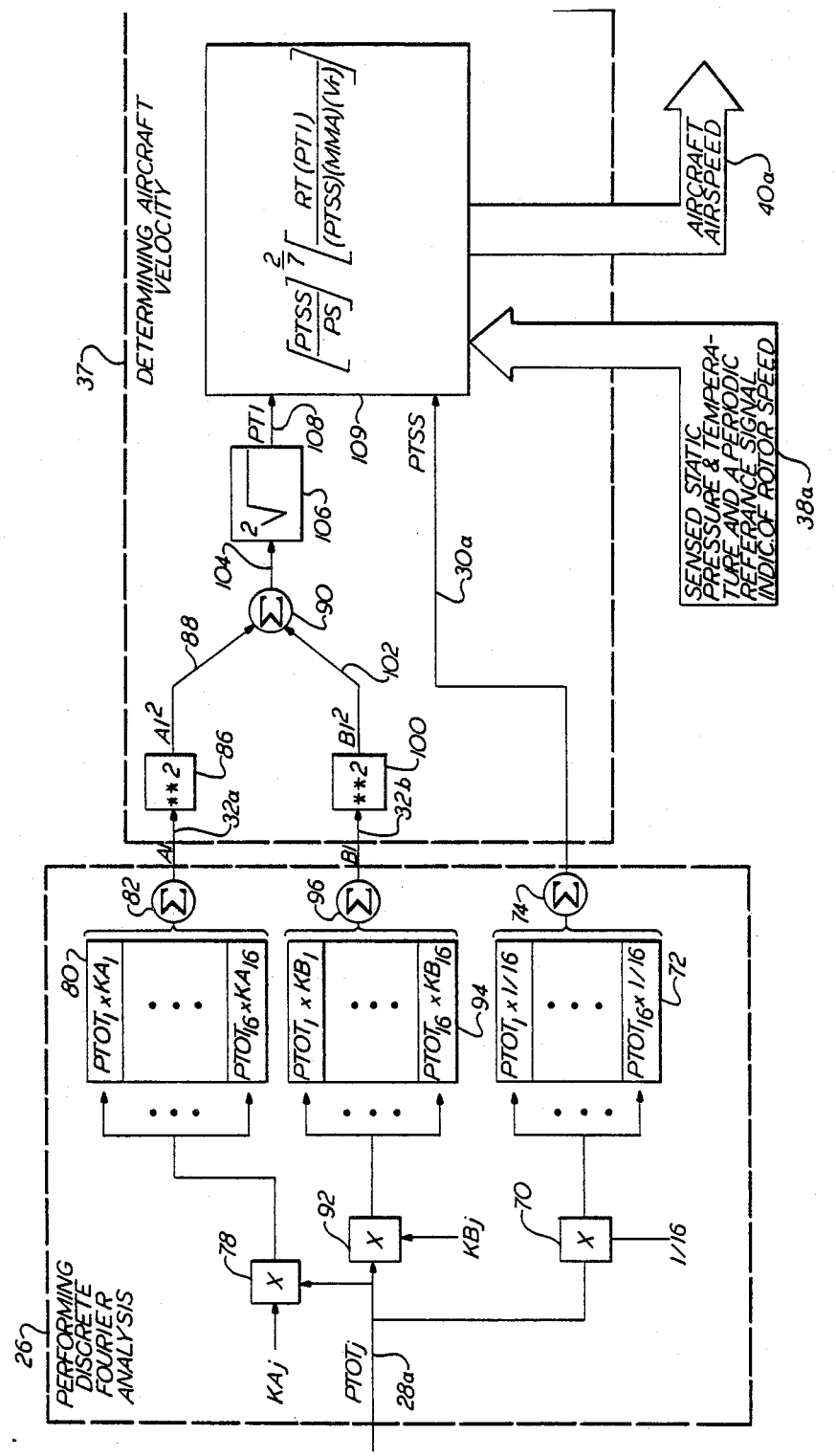
FIG. 3 is a more detailed, but still simplified, block diagram illustration of the discrete Fourier analysis and aircraft velocity determination steps of FIG. 1.

The mapped samples on line 28 of FIG. 1 may be represented, as shown in FIG. 3, by a signal line 28a on which is sequentially provided a series of total pressure samples (PTOT$_j$), each corresponding to a pressure sample taken during one of the subrevolution intervals. Each of these samples is multiplied in a step 70 by a factor of $1/m$, e.g., $1/16$, where m corresponds to the number of subrevolution intervals in one revolution. For the specific example, a sixteen register stack 72 is provided for storing sixteen successive total pressure samples, each multiplied by $1/16$ prior to storage. Each time one of the registers is updated, a summation step may be performed, as indicated by a step 74, and a summed steady state component signal (PTSS) provided on a line 30a. Or, the entire stack may be updated once per revolution before the summation step 74 is performed. Other variations of timing for updates and summing are of course possible.

Each of the pressure samples on line 28a is also multiplied by a Fourier coefficient or weighting factor, KA$_j$, in a step 78. The weighting factor KA$_j$ corresponds to the average of the $\cos(nx)$ term in equation (3) evaluated over the subrevolution interval of interest for the first harmonic. A stack 80 is kept up-to-date with the latest weighted pressure samples. As with the steady state stack 72, the stack 80 may be summed every time one of the registers is updated, may be summed only once every revolution of the rotating member, or summed at some other interval consistent with the summing intervals utilized in the other summing steps. In any event, after a summation step 82, a quadrature component signal (A1) is provided on a line 32a. The quadrature signal on line 32a is squared in a step 86 and a first squared signal is provided on a line 88 to a summation step 90.

The sampled signals on line 28a are also weighted in a separate step 92 by a Fourier weighting factor, KB$_j$. The weighting factor KB$_j$ corresponds to the $\sin(nx)$ term in equation (4) evaluated over the subrevolution interval of interest for the first harmonic. The weighted pressure samples are stored in a stack 94 and are summed in a step 96 each time a register is updated or once every revolution, or at some other interval, depending on design choice consistent with the other summing steps 74, 82. A second quadrature component signal (B1) is provided on a line 32b which is squared in a step 100 in order to provide a second squared quadrature signal on a line 102, to be summed with the first squared quadrature signal on line 88 in step 90. A summed signal on a line 104 is then provided, and its square root is taken in a step 106 in order to provide a resultant signal (PT1) on a line 108. The resultant signal is indicative of the magnitude of the first harmonic of the pressure variations occurring at the end of the rotating member.

It will of course be appreciated that FIG. 3 is a systems level diagram of the signal manipulations which may take place, according to the present invention, in order to produce a direction signal from a sampled pressure signal. This may be implemented by means of a general purpose signal processor, a dedicated signal processor, or a special purpose signal processor, whether in the form of an integrated circuit or discrete components, or even a plurality of separate circuits, each performing a separate function. For example, the resolution of the quadrature signals into a resultant signal may be carried out by a separate circuit such as is disclosed in U.S. Pat. No. 3,584,783 to Kobori. All of this is a matter of design choice.

A step 109 next performs a calculation which represents a binomial expansion of Bernoulli's equation of compressible flow. The particular equation utilized is as follows:

$$\text{AIRSPEED} = \left[\frac{PTSS}{PS}\right]^{2/7} \cdot \left[\frac{RT(PT1)}{(PTSS)(MMA)(V_r)}\right]$$

where:
  MMA is molecular air mass (kg/mole),
  $V_r$ is rotor tip velocity (m/sec),
  T is static temperature (°K),
  R is the universal gas constant (joule/mole−°K),
  PTSS is the average pressure at the rotor tip, as seen during one revolution (newton/m²,
  PT1 is the first harmonic component of the pressure at the rotor tip as seen during one revolution, and (newton/m²).
  PS is the static pressure (newton/m²).

Figure 4:
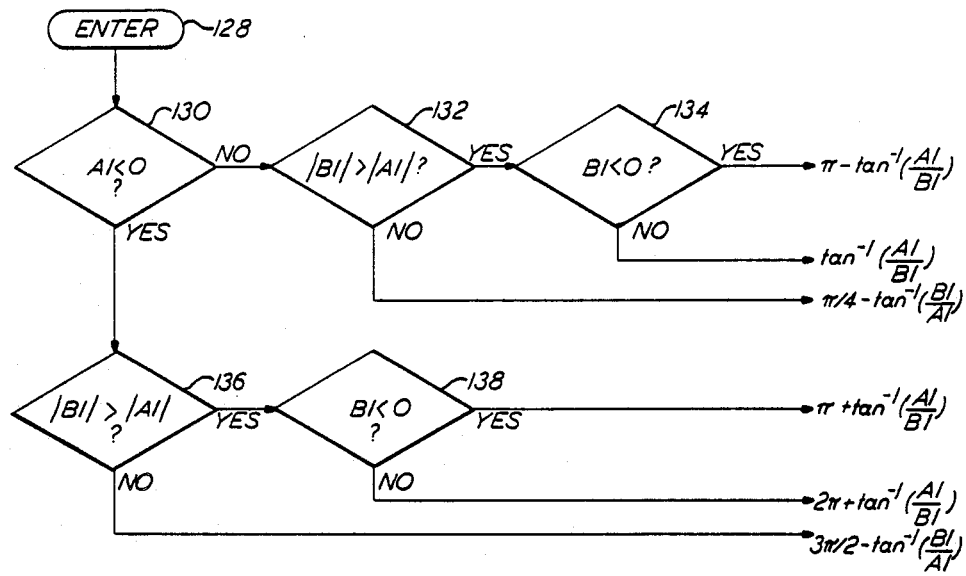
FIG. 4 is a more detailed, but still simplified, block diagram illustration of the steps which may be carried out in the direction determining step of FIG. 1.

FIG. 4 is an illustration of the steps which may be carried out in step 34 of FIG. 1, in determining the direction of the aircraft with respect to a frame of reference fixed in the aircraft. As previously mentioned in connection with FIG. 9, an example of such a frame of reference, or coordinate system, is shown in FIG. 5 for the helicopter 120 shown as viewed from above in a plan view. The coordinate system shown has one of its axes coincident with the longitudinal axis of the helicopter. The forward direction of flight arbitrarily is designated as the starting point, being equivalent to zero or $2\pi$ radians. The aft direction corresponds to $\pi$ radians while a direction to the pilot's right corresponds to an angle of $\pi/2$ taken in a clockwise direction with respect to the $2\pi$ reference axis. Similarly, $3\pi/2$ radians corresponds to the pilot's left.

Referring back to FIG. 4, assuming the quadrature components 32 of FIG. 1 have been received, a step 128 is executed in which an entrance is made to a series of steps for determining the direction of flight. A step 130 is next executed in which a determination is made as to whether or not the magnitude of the first quadrature signal on line 32a of FIG. 3 is less than zero or not. If not, a determination is made in a step 132 as to whether or not the absolute value of the second quadrature component on line 32b of FIG. 3 signal is greater than that of the absolute value of the first quadrature component signal. If so, a determination is made in a step 134 as to whether or not the second quadrature signal magnitude is less than zero or not. If so, the direction of flight is determined to be equal in magnitude to $[\pi-\arctan(A1/B1)]$. If not, the direction of flight is determined to be equal in magnitude to $[\arctan(A1/B1)]$. For these and all of the mathematical expressions for direction which follow, it should be understood that the arctangent expressions are is defined between $-\pi/4$ and $+\pi/4$ radians as defined in FIG. 5.

If a determination was made in step 132 that the absolute value of the second quadrature component signal was not greater than the absolute value of the first quadrature component signal, the magnitude of the direction signal is determined to be equal to $[(\pi/4)-\arctan(B1/A1)]$.

If a determination was made in step 130 that the magnitude of the first quadrature component signal is less than zero then a step 136 is next executed in which a determination is made as to whether or not the absolute value of the second quadrature component signal is greater than that of the first quadrature component signal. If so, a determination is next made in a step 138 as to whether or not the magnitude of the second quadrature component signal is less than zero. If so, the magnitude of the direction signal is determined to be equal to $[\pi+\arctan(A1/B1)]$. If not, the magnitude of the direction signal is determined to be equal to $[2\pi+\arctan(A1/B1)]$.

If a determination was made in step 136 that the absolute value of the second quadrature component signal is not greater than that of the first quadrature component signal, the direction signal is determined to be equal to a magnitude equivalent to $[(3\pi/2)-\arctan(B1/A1)]$.

For all of these determinations, the magnitude of the direction signal on line 36 of FIG. 1 is set to a level which is reflective thereof.

Referring now to FIG. 6, an embodiment for carrying out the steps shown in FIG. 1 is shown. Sensors 150 include a plurality of individual sensors 152 . . . , 154, 156, 158 which provide a plurality of sensed signals to a number of signal conditioning entities, to be described subsequently, which generally may be thought of as being within a sampling unit (boundaries not shown) for carrying out the sampling function 12 shown in FIG. 1. Such a sampling unit includes everything shown in FIG. 6 except for the sensors 150, the signal processor 160 and the data and address busses at the top and bottom, respectively of the Figure. The data and address busses are not necessarily present in the hardware embodiment and are shown primarily for the sake of convenience. The signal processor 160 may be thought of as carrying out the signal processing step 19 of FIG. 1. Thus, it will be understood that FIG. 6 is primarily directed to showing how the sampling function step 12 of FIG. 1 may be carried out in hardware.

Figure 10:
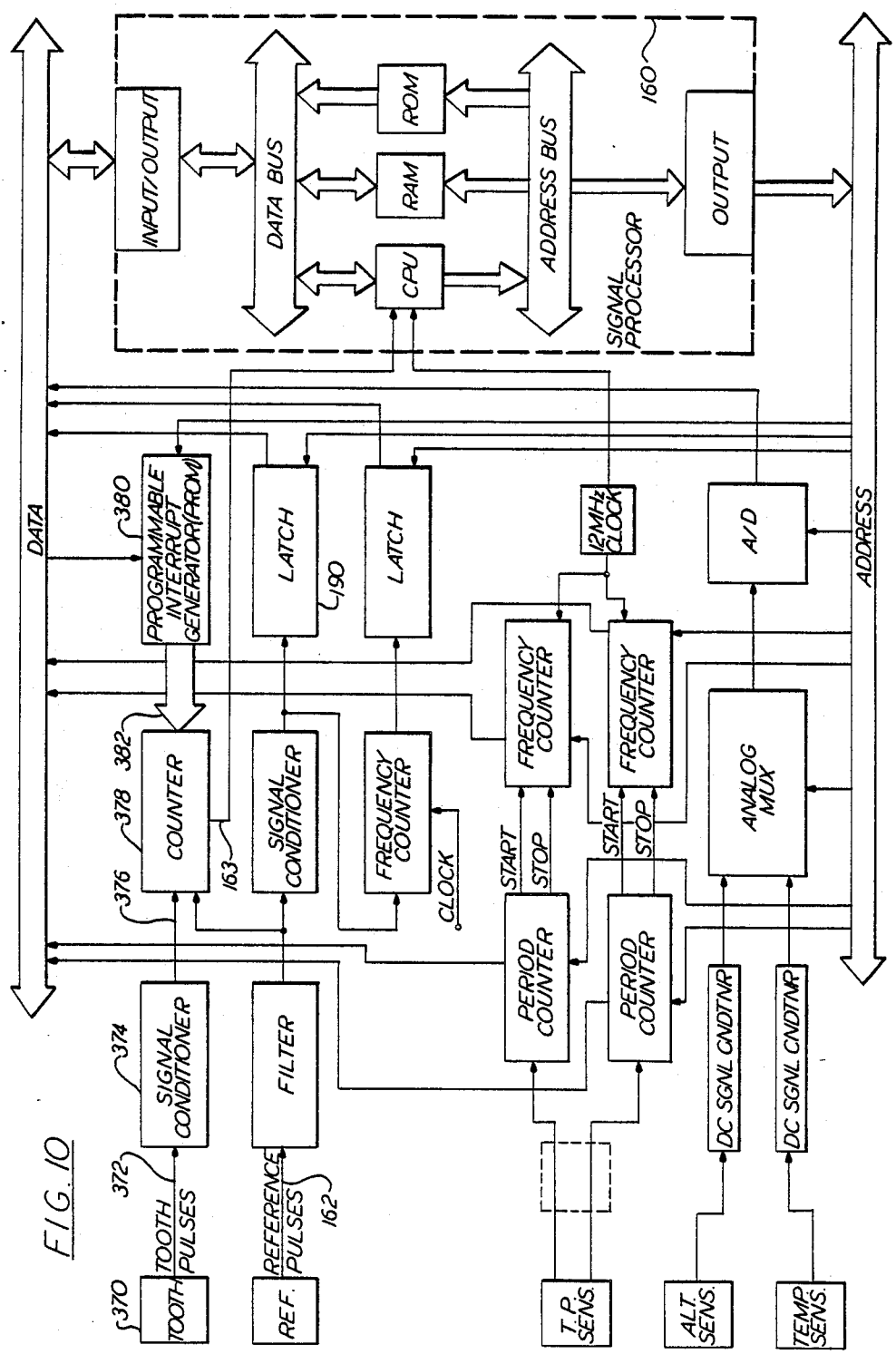
FIG. 10 is a simplified block diagram illustration of hardware which might be utilized in carrying out the sensing, sampling and signal processing steps of FIG. 1.

There are various ways of providing sampled signals to the signal processor 160 from the sensed signals provided by sensors 150. One way is to provide "hard" synchronization in which hardware provides interrupts to the processor that are a function of the angle of the rotating member with respect to the reference frame. In this way, hardware synchronizes the pressure samples. Hard synchronization will be described subsequently, in connection with FIG. 10. Another approach is to use "soft" synchronization in which software computes the time per pressure sample and this calculation is used to synchronize the pressure samples. Soft synchronization will be described first, in connection with FIG. 6. The hard synchronization approach is theoretically more accurate due to the assumption, in the soft synchronization approach, that the rotor angular velocity remains constant during a given revolution. In practice, however, there is little difference in result between the two approaches and soft synchronization may often be preferred due to its lower hardware cost. Other methods are of course possible and these two should be thought of as merely two such methods for synchronizing samples with rotating arm motion. For example, see U.S. Pat. No. 4,181,962 to West, Jr. et al. For both of the approaches disclosed, a reference pulse is received on a line 162 as shown in FIGS. 6 and 10 every time the rotating arm crosses a fixed position on the aircraft. The reference pulse, for example, may have an amplitude of plus or minus 0.7 volts and may last for about one millisecond. Both the "hard" and "soft" synchronizing methods are "reset" by the reference pulse, for the embodiments shown.

Figure 7:
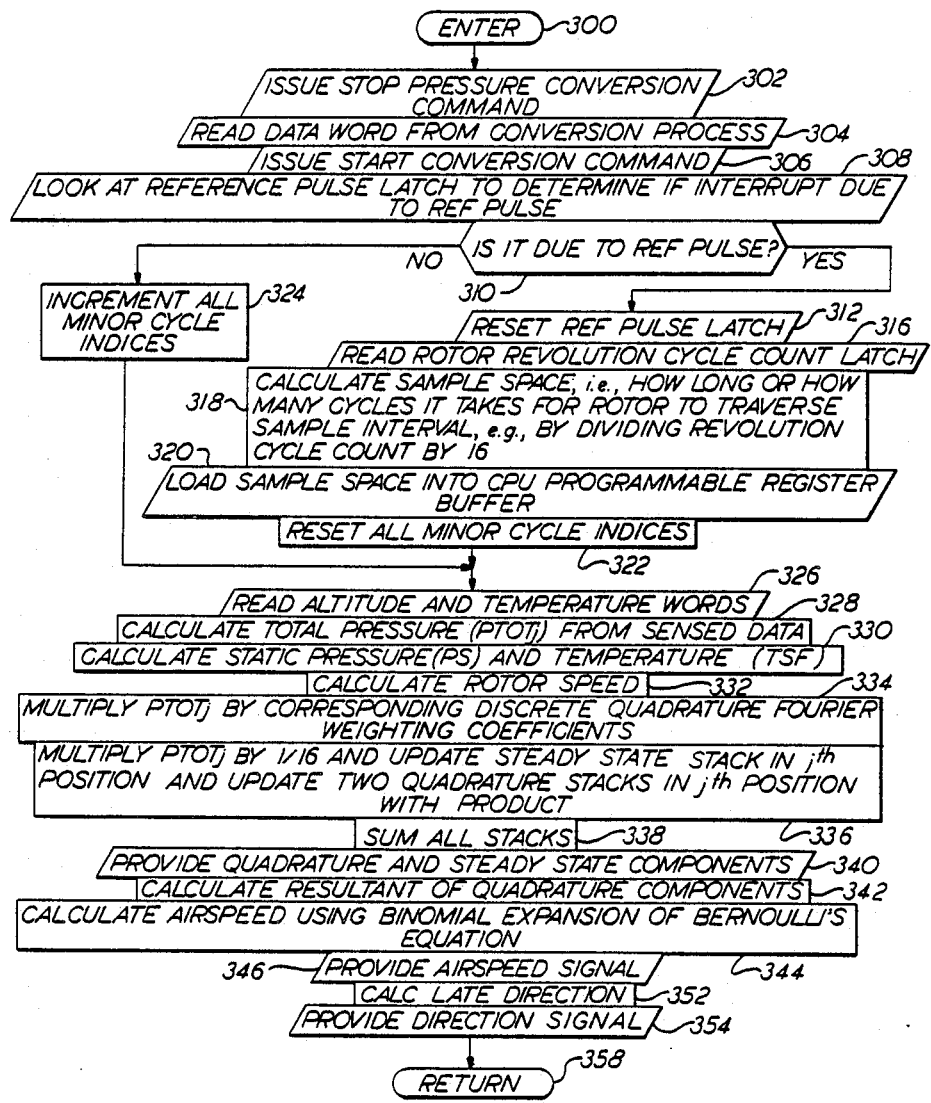
FIG. 7 is a simplified block diagram illustration of a series of logical steps which might be carried out by the signal processor of FIG. 6.

For the "soft" synchronization method carried out by the embodiment of FIG. 6, the time per pressure sample is calculated by software resident in the signal processor 160 to be described subsequently in more detail in connection with FIG. 7. Based on this calculation, the hardware of FIG. 6 generates interrupts on line 163 which tell the processor when to read the pressure. The flow chart of FIG. 7 is entered every time the signal processor receives such an interrupt.

In order to measure the time per pressure sample interval, i.e., how long it takes the rotor, e.g., to sweep out an angle of $\pi/8$, a counter 164 counts the cycles of a high frequency clock signal provided on a line 166. Software within the signal processor 160 calculates the expected time elapsed per pressure sample during each revolution in terms of cycles of the high frequency clock. The calculation is based on the time of the last revolution. When this calculation is completed, the number is stored in a buffer latch 168 via a data line 170 from the signal processor 160 as loaded by a signal on a line 171. The output of the counter 164 is compared in a comparator 172 to the contents of the buffer latch 168. When the two numbers agree, an interrupt is generated on the line 163 to the signal processor 160 and the counter 164 is reset by means of a signal line 176 to an OR gate 178 which transmits the reset signal on a line 180 to the counter 164. The counter may also be reset by means of a filtered and conditioned reference pulse signal on a line 182. The reset signals on line 176 correspond in number to the number of samples taken per revolution. The reset signal on line 182 is provided once per revolution. Thus, once every "m" repetitions of the reset signal on line 176 the reference signal on line 182 will coincide with the reset signal.

The reference pulses on line 162 are provided to a filter 184 which in turn provides a filtered reference pulse signal on a line 186 to a signal conditioner 188. The signal conditioned reference pulse on line 182 is provided to the OR gate 178, to a reference pulse latch 190 and to a frequency counter 192. The reference pulse latched in latch 190 is read by the signal processor 160 via a data line 194. The processor reads the latch 190 in order to determine when the rotating member has recently crossed the reference position. Once it is determined by the processor that this has occurred, the processor will then reset the latch via an address line 196.

The time between the reference pulses on line 162 is measured in order to determine rotor RPM. In order to measure this time the counter 192 will count periods of a fixed frequency clock signal on line 198 from one reference pulse to the next. The counter 192 output on line 200 is latched in a rotor revolution cycle count latch 202. The frequency counter 192 is reset and restarted by the signal on line 182. 192.

Total pressure frequency is measured by counting periods i.e., cycles, of a pressure signal on a line 206 from a temperature-pressure sensor 154. This sensor provides the signal on line 206 as a function of pressure and which also happens to depend on temperature for the particular sensor selected for one embodiment. The sensor 154 also provides frequency a signal on a line 208 which is purely dependent on temperature. A set of slip rings 210 may typically be used in a helicopter application to transfer the signal from a rotating rotor to a helicopter fuselage which is stationary with respect thereto. These two signals 206, 208 may be used in the mapping step 20 of FIG. 1 to determine the proper temperature curve 63 of FIG. 2, for example, based on the sensed temperature indicated by the signal on line 208 of FIG. 6 and the sensed frequency indicated by the signal on line 206.

Staying now with FIG. 6, a period counter 210 counts the number of cycles to occur of the frequency modulated signal on line 206 from the pressure sensor and a frequency counter 212 simultaneously counts periods of a 12 megahertz clock signal on a line 214 provided by a fixed frequency 12 megahertz clock signal source 216.

A period counter 218 and a frequency counter 220 perform similar functions in connection with measuring the respective number of cycles to occur of the signal on the line 208 from the temperature part of the sensor 154 and the 12 megahertz clock 216. Every time that an interrupt signal on line 163 is sent to the signal processor 160, the signal processor will provide an interrupt to each of the period counters 210, 218 on signal lines 222, 224, respectively. This will stop the counts in each of the period counters 210, 218 while immediately or almost immediately thereafter STOP signals will be sent on lines 226, 228, respectively, to the frequency counters 212, 220. The counts of both the period counters 210, 218 and the frequency counters 212, 220 are read over data lines 230, 232, 234, 236 by the signal processor 160. Start signals on lines 238, 240 are then sent to the frequency counters to restart the 12 megahertz cycle count. The period counters 210, 218, are restarted at substantially the same time. These counts are utilized in the signal processor in a manner to be described subsequently in connection with FIG. 7.

Outside air temperature is measured by means of a temperature sensor 158 which may be, for example, a Rosemount model 102-AV-ICK-510-BF-56 resistive probe with 500 ohms equal to 0° C. The temperature sensor 158 is excited by a source (not shown) and in turn provides a temperature signal on a line 250 to a DC signal conditioner 252.

Similarly, static air pressure may be sensed by means of a altitude sensor 156 which may, for example, be a Rosemount model 1241A altitude sensor in which 1VDC equals approximately 305 meters. A static air pressure signal is provided on a line 254 to a second DC signal conditioner 256. Conditioned temperature and static pressure signals are provided on signal lines 258, 260 to an analog multiplexer 262 which switches between the two signals on line 258, 260 in accordance with a control signal provided on a line 264 from the signal processor 160. One or the other of the temperature and static pressure signals is provided on a signal line 266 to an analog to digital (A/D) converter 268 which provides a digital temperature or static pressure signal on a line 270 to the signal processor 160.

The signal processor 160 is shown comprised of a typical general purpose signal processor architecture having an input/output port 280, and output port 282, a data bus 284, an address bus 286, a central processing unit (CPU) 288, a random access memory (RAM) 290 and a read only memory (ROM) 292. Of course, a special purpose or dedicated processor will serve equally well.

The ROM 292 will typically store a sequence of logical step to be performed according to a preselected program such as is illustrated in FIG. 7, to be described below. The RAM is utilized to store intermediate values which need only be stored temporarily and which will normally disappear upon removal of power. The CPU 288 is of course responsible for controlling the sequence of logical steps outlined in FIG. 7 and for inputting and outputting various signals at the proper times.

Referring now to FIG. 7, a series of logical steps are there illustrated, in simplified form, for carrying out the sampling step 12 illustrated in FIG. 1 in conjunction with the hardware of FIG. 6 and, in addition, for carrying out the discrete Fourier analysis 26 and aircraft velocity and direction determinations 37, 34 of FIG. 1. Although not explicitly described in connection with FIG. 7, it will be understood that the mapping function of FIG. 2, as well as other mapping functions, may be carried out in the signal processor as well.

After entering in a step 300, after receiving an interrupt on line 163 of FIG. 6, a stop pressure conversion command is issued on lines 222, 224 of FIG. 6 to the period counters 210, 218. This causes the period counters to stop counting pressure and temperature cycles and to issue stop commands on lines 226, 228 to the frequency counters 212, 220.

A step 304 is next executed in which the counts held within the counters 210, 218, 212, 220 are read on data word lines 230, 232, 234, 236 by the signal processor 160 via the input/output port 280. Once the data words have been read, a start conversion command is issued on lines 222, 224, as indicated in a step 306, which causes the counters 210, 218 to issue START commands on lines 238, 240 and the counters 210, 218, 212, 220 start counting again. The signal processor then executes a step 308 in which the contents of the reference pulse latch 190 of FIG. 6 is examined to determine, as indicated in a step 310, whether the interrupt was due to a reference pulse or not. This information is read out over line 194 of FIG. 6. If it is determined that the interrupt was due to a reference pulse on line 162 of FIG. 6 then the reference pulse latch 190 is reset by the signal processor 160 using signal line 196 as indicated by step 312 of FIG. 7. This is done immediately in order to clear the reference pulse latch prior to the end of the next sample period.

The signal processor then reads the contents of the rotor revolution cycle count latch 202 of FIG. 6 over a data line 314 as indicated in a step 316. Having read this information, the signal processor is now able to calculate how many cycles of the clock signal on line 198 it takes for the rotating member to traverse a selected sample interval, for example, by dividing the revolution cycle count by 16, for a case where 16 equal samples are taken per revolution, as indicated in a step 318.

The results of that calculation are then loaded into the CPU programmable register buffer 168 of FIG. 6 via data line 170, as indicated in a step 320 of FIG. 7. The signal processor then resets all minor cycle indices, as indicated in a step 322. This would include the Fourier coefficients $KA_j$ and $KB_j$ of FIG. 3. It would also include the stacks 72, 80, 94, among other things.

If a determination was made in step 310 that the interrupt which caused entry into the program at step 300 was not due to a reference pulse on line 162, then a step 324 would have been executed in lieu of steps 312, 316, 318, 320, 322, in which all subrevolution indices are incremented. These indices function as labels for the incoming pressure samples on a per revolution basis.

In either event, a step 326 is next executed in which the magnitudes of the altitude and temperature signals on lines 254, 250 are read via data line 270. A calculation of the total pressure for the sample space of interest is made in a step 328 and the result of that calculation may be thought of as being equivalent to providing the $PTOT_j$ signal on line 28a of FIG. 3. This may be an average pressure signal over the interval.

The signal processor 160 next executes a step 330 in which static pressure (PS) and temperature (TSF) are calculated from the data obtained on line 270 of FIG. 6. The angular velocity of the rotating member is next calculated in a step 332 for use in the next sample space calculation.

A step 334 is next executed in which the $PTOT_j$ total pressure calculation made in step 328 is multiplied by a corresponding discrete quadrature Fourier weighting coefficient for two separate quadrature components as indicated in FIG. 3 by the multiplication steps 78, 92.

A step 336 is next executed in which $PTOT_j$ is multiplied by 1/m, in which m equals the number of subrevolution intervals; the steady state stack is updated in the jth position and also the two quadrature stacks are updated in the jth positions with the products obtained in step 334. A step 338 is next executed in which the contents of all stacks are summed as indicated by steps 74, 82, 96 of FIG. 3. Quadrature component signals are provided on lines 32a, 32b and a steady state component signal is provided on line 30a of FIG. 3 as indicated by a step 340 in FIG. 7.

A step 342 is next executed in which a resultant is calculated and a resultant signal provided on line 108 of FIG. 3.

A calculation of airspeed is next made in a step 344 using a binomial expansion of Bernoulli's equation as indicated in FIG. 3 by the calculation step 109.

An airspeed signal is next provided as indicated in a step 346 on a signal line 40 of FIG. 1 or a signal line 40a of FIG. 3 or a signal line 348 of FIG. 6 for transmission to an external unit such as via an ARINC transmitter (not shown) as indicated by an address signal on a line 350 in FIG. 6.

A direction calculation is next executed in a step 352 as similarly indicated in the step 34 of FIG. 1. A direction signal is provided as indicated by a step 354, on line 36 of FIG. 1 or line 356 of FIG. 6 and a return is then made in a step 358. The direction data is addressed in the external unit by means of a direction signal shown on a line 360 of FIG. 6.

The logical steps illustrated in FIG. 7 will be reentered in step 300 upon reception of the next to occur interrupt signal on line 163. Referring now to FIG. 10, a "hard" synchronization scheme is there shown for implementing the sampling function 12 of FIG. 1. It will be observed that the scheme of FIG. 10 is very similar to that of FIG. 6 except for not having the OR gate 178, the counter 164, the comparator 172 and the CPU programmable register buffer 168 of FIG. 6. Instead, FIG. 10 shows a tooth counter 370 which provides tooth pulses on a line 372 to a signal conditioner 374. The signal conditioner in turn provides tooth pulses on a line 376 to a counter 378 which counts up the number of tooth pulses received per revolution of the rotating member. A programmable interrupt generator 380 provides a signal on a line 382 indicative of the number of counts in a sample space, i.e., the number of tooth pulses which are required for the rotating member to sweep out an angle equal to the sample space angle. The count within the period counter 378 is compared to the count provided on line 382 and an interrupt is provided on the line 163, as in FIG. 6, whenever that count equals the count on line 382. Thus, the output of the period counter 378 will be a series of interrupts to the processor. The interrupts are based on the number of teeth counted since the last reference pulse. If, for example, there are 912 teeth between reference pulses the interrupts will be programmable so that they may be generated by any value of tooth count from zero to 912.

The counter 378, which stores the current value of tooth count, is reset by the reference pulse received on line 162. In this way, the reference pulse synchronizes the pressure sample cycle within the blade cycle.

The reference pulse is of course latched, as in FIG. 6, in latch 190. The processor 160 will read the latch in order to determine when the blade has recently crossed the fixed angle of reference. The processor will then reset the latch 190.

Other than there slight differences, the hardware of FIG. 10 is little different from that of FIG. 6, necessitating very little change to the flow chart of FIG. 7, as will be evident to those skilled in the art of programming.

Referring back to FIG. 1, it will be recalled that it was previously mentioned that the mapping step 20 may include steps for working out some of the steps of an exact solution of Bernoulli's equation rather than the binomial expansion shown in step 109 of FIG. 3. It will be understood that Bernoulli's equation generally takes the form of $$P_T = P_S \left[ 1 + \frac{KV^2}{T} \right]^{7/2}$$

where
$P_T$ = total pressure (Newton/m$^2$),
$P_S$ = static pressure (Newton/m$^2$),
V = sensor velocity (i.e., pitot velocity, in m/sec)
T = static temperature (°K), and
K = a constant (sec$^2$ — °K/m$^2$)

The expression on the right-hand side of the above equation may be though of as being evaluated by the step 109 of FIG. 3. However, it will be realized that this expression may be re-written as follows:

$$(P_T/P_S)^{2/7} = \frac{KV^2}{T} + 1$$

In the re-written version it will be seen that the left-hand side of the expression can be evaluated first in step 20 of FIG. 1 since it only requires static pressure and the sensed pressure at the tip of the rotating member. A static pressure signal, as indicated by a dashed signal line 359 of FIG. 1, will of course be made available for the purposes of performing such a modified step 20. The pressure samples taken to the two-seventh power can then be provided on mapped sample lines 28 to be operated upon in the step 26; a discrete Fourier analysis may then be performed on those samples in lieu of those described. The resulting first harmonic component (FH) may be used to obtain airspeed as follows:

$$\text{AIRSPEED} = \left[ \frac{T(FH)}{V_r} \right] C$$

where,
T = static temperature,
$V_r$ = rotor velocity, and
C = a constant. In that event, the evaluation for determining aircraft velocity in step 37 will change to a form generally similar to that shown on the right-hand side of the above equation.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. Apparatus for providing an airspeed signal indicative of an aircraft's velocity relative to an air mass surrounding the aircraft and for providing a direction signal indicative of the aircraft's direction in the air mass with respect to a frame of reference fixed in the aircraft, the aircraft having a plurality of signals available, including: (i) a sensed signal indicative of pressure at an end of a rotating member, (ii) a sensed periodic reference signal indicative of the rotating member periodically passing a reference position relative to the frame of reference, and (iii) a sensed signal indicative of static pressure of the air mass, the apparatus comprising:

sampling means for selectively sampling the magnitude of the sensed pressure signal according to the position of the rotating member for each of a plurality of subrevolution intervals determined with respect to the sensed periodic reference signal, said sampling means providing sampled signals having magnitudes indicative of said magnitude of the sensed pressure signal during each of said plurality of subrevolution intervals;

signal processing means, responsive to said sampled signals for providing Fourier component signals having magnitudes indicative of Fourier component representations of the pressure at the end of the rotating member, said signal processing means utilizing said component signals and the static pressure signal for determining aircraft velocity and direction, said signals processing means providing the airspeed and direction signals having magnitude indicative thereof.

2. The apparatus of claim 1, wherein said signal processing means comprises:

means for providing, for each of said plurality of subrevolution intervals, a discrete steady state component signal having a magnitude indicative of a discrete Fourier series steady state component of the pressure at the end of the rotating member over each subrevolution interval;

means for summing said discrete steady state component signals and providing said steady state Fourier component signal as the summation thereof;

means for providing, for each of said plurality of subrevolution intervals, a pair of first harmonic discrete quadrature component signals having respective magnitudes indicative of the magnitudes of discrete Fourier series quadrature components of the first harmonic of the pressure at the end of the rotating member over each subrevolution interval;

means for summing said discrete quadrature component signals and providing said pair of quadrature Fourier component signals as the summation thereof;

means for providing a Fourier series first harmonic resultant signal having a magnitude indicative of the resultant of the magnitudes of said pair of quadrature Fourier component signals;

means for providing the airspeed signal having a magnitude indicative of the aircraft's velocity relative to the air mass, the airspeed signal being a function of the magnitudes of said steady state Fourier component signal, said first harmonic resultant signal and the sensed static pressure signal; and means for providing the direction signal indicative of the aircraft's direction relative to the frame of reference, the direction signal being a function of said pair of quadrature Fourier component signals.

3. The apparatus of claim 1, wherein the sensed signal indicative of pressure at the end of the rotating member is a periodic signal having a frequency greater than that of the rotating member and wherein the sensed signal indicative of pressure at the end of the rotating member is frequency modulated in proportion to pressure variations occurring in response to motion of the aircraft relative to the air mass and wherein said sampling means further comprises means for determining the average frequency of said frequency modulated sensed signal during each of the plurality of subrevolution intervals and providing, for each subrevolution interval, an average frequency signal having a magnitude indicative thereof.

4. The apparatus of claim 3, wherein said means for determining the average frequency of said frequency modulated sensed signal comprises:

means for counting the number of cycles to occur of said frequency modulated sensed signal during each of the plurality of subrevolution intervals and providing a pressure cycles count signal having a magnitude indicative of the number of cycles counted;

means for providing a fixed frequency reference signal;

means for counting the number of cycles to occur of said fixed frequency reference signal during each of said plurality if subrevolution intervals and providing a clock cycles count signal having a magnitude indicative of the number of cycles counted;

means for dividing the magnitude of said pressure cycles count signal by the magnitude of said clock cycles count signal and for providing, for each of said plurality of subrevolution intervals, a quotient signal having a magnitude indicative of the quotient between said pressure cycles count signal and said clock cycle count signal; and means for multiplying the magnitude of said quotient signal by a clock frequency signal having a magnitude indicative of said fixed frequency of said reference signal and for providing, for each of said plurality of subrevolution intervals, an average frequency signal having a magnitude indicative of the product therebetween and indicative of said average frequency of said frequency modulated sensed signal.

5. The apparatus of claim 2, wherein said means for summing said discrete steady state component signals and said discrete quadrature component signals carries out said summing over a selected number of subrevolution intervals representing an integral number of revolutions of the rotating member.

6. The apparatus of claim 2, wherein said means for providing a Fourier series first harmonic resultant signal comprises:

means for separately squaring the magnitudes of each of said pair of quadrature Fourier component signals and providing a pair of squared signals having magnitudes indicative thereof;

means for summing said squared signals and providing a summed squared signal having a magnitude indicative thereof; and means for raising the magnitude of said summed squared signal to the one-half power and providing the one-half root of said summed squared signal as said Fourier series first harmonic resultant signal.

7. The apparatus of claim 2, wherein said means for providing the airspeed signal comprises:

means for dividing the magnitude of said summed steady state Fourier component signal by the magnitude of said sensed static pressure signal and providing a ratio signal having a magnitude indicative of the quotient of said summed steady state Fourier component signal and said sensed static pressure signal;

means for raising said ratio signal to the two-seventh power and providing a two-seventh root signal indicative of the magnitude thereof;

means for multiplying the magnitude of said sensed static temperature signal by the magnitude of said Fourier series first harmonic resultant signal and providing a product signal having a magnitude indicative thereof;

means for dividing the magnitude of said product signal by the magnitude of said steady state Fourier series component signal and providing a quotient signal having a magnitude indicative thereof; and means for multiplying the magnitude of said quotient signal by a constant signal magnitude and by said two-sevenths root signal and providing said airspeed signal having a magnitude indicative of the aircraft's velocity relative to the air mass.

8. The apparatus of claim 2, further comprising means for correcting said Fourier series first harmonic resultant signal by a factor of $[(m/\pi)\sin(\pi/m)]^2$, where m equals the number of said plurality of subrevolution intervals.

9. A method of providing an airspeed signal indicative of an aircraft's velocity relative to an air mass surrounding the aircraft and of providing a direction signal indicative of the aircraft's direction in the airmass relative to a frame of reference fixed in the aircraft, the aircraft having a plurality of signals available, including: (i) a sensed signal indicative of pressure at an end of a rotating member, (ii) a sensed periodic reference signal indicative of the rotating member periodically passing a reference position relative to the frame of reference, and (iii) a sensed signal indicative of static pressure of the air mass, the method comprising:

selectively sampling the magnitude of the sensed pressure signal according to the position of the rotating member for each of a plurality of subrevolution intervals, and providing sampled signals having magnitudes indicative of said magnitude of the sensed pressure signal during each of said plurality of intervals, as determined with respect to the sensed periodic reference signal;

providing, in response to said sampled signals, Fourier component signals having magnitudes indicative of Fourier component representations of the pressure at the end of the rotating member; and utilizing said component signals for determining aircraft velocity and direction, said signal processing means providing the airspeed and direction signals having magnitudes indicative thereof.

10. The method of claim 9, wherein said signal processing step comprises the steps of:
providing, for each of said plurality of subrevolution intervals of the rotating member, a discrete steady state component signal having a magnitude indicative of a discrete Fourier series steady state component of the pressure at the end of the rotating member over each subrevolution interval;
summing said discrete steady state component signals and providing said steady state Fourier component signal as the summation thereof;
providing, for each of said plurality of subrevolution intervals, a pair of first harmonic discrete quadrature component signals having respective magnitudes indicative of the magnitudes of discrete Fourier series quadrature components of the first harmonic of the pressure at the end of the rotating member over each subrevolution interval;
summing said discrete quadrature component signals and providing said pair of quadrature Fourier component signals as the summation thereof;
providing a Fourier series first harmonic resultant signal having a magnitude indicative of the resultant of the magnitudes of said pair of quadrature Fourier component signals;
providing the airspeed signal having a magnitude indicative of the aircraft's velocity relative to the air mass, the airspeed signal being a function of the magnitudes of said steady state component Fourier component signal, said first harmonic resultant signal and the sensed static pressure signal; and
providing the direction signal indicative of the aircraft's direction relative to the frame of reference, the direction signal being a function of said pair of quadrature Fourier component signals.

11. The method of claim 9, wherein the sensed signal indicative of pressure at the end of the rotating member is a periodic signal having a frequency greater than that of the rotating member and wherein the sensed signal indicative of pressure at the end of the rotating member is frequency modulated in proportion to pressure variations occurring in response to motion of the aircraft relative to the air mass and wherein said step of selectively sampling further comprises the step of determining the average frequency of said frequency modulated sensed signal during each of the plurality of subrevolution intervals and providing, for each subrevolution interval, an average frequency signal having a magnitude indicative thereof.

12. The method of claim 11, wherein said step of determining the average frequency of said frequency modulated sensed signal comprises the steps of:
counting the number of cycles to occur of said frequency modulated sensed signal during each of the plurality of subrevolution intervals and providing a pressure cycles count signal having a magnitude indicative of the number of cycles counted;
providing a fixed frequency reference signal;
counting the number of cycles to occur of said fixed frequency reference signal during each of said plurality if subrevolution intervals and providing a clock cycles count signal having a magnitude indicative of the number of cycles counted; and
for each of said plurality of subrevolution intervals, dividing the magnitude of said pressure cycles count signal by the magnitude of said clock cycles count signal, providing a quotient signal having a magnitude indicative of the quotient therebetween, multiplying the magnitude of said quotient signal by a clock frequency signal having a magnitude indicative of said fixed frequency of said reference signal and providing an average frequency signal having a magnitude indicative of the product therebetween and indicative of said average frequency of said frequency modulated sensed signal.

13. The method of claim 10, wherein said steps of summing said steady state component signals and said discrete quadrature component signals are carried out for a selected number of subrevolution intervals representing an integral number of revolutions of the rotating member.

14. The method of claim 10, wherein said step of providing a Fourier series first harmonic resultant signal comprises the steps of:
separately squaring the magnitudes of each of said pair of quadrature Fourier component signals and providing a pair of squared signals having magnitudes indicative thereof;
summing said squared signals and providing a summed squared signal having a magnitude indicative thereof; and
raising the magnitude of said summed squared signal to the one-half power and providing the one-half root of said summed squared signal as said Fourier series first harmonic resultant signal.

15. The method of claim 10, wherein said step of providing the airspeed signal comprises the steps of:
dividing the magnitude of said summed steady state Fourier component signal by the magnitude of said sensed static pressure signal and providing a ratio signal having a magnitude indicative of the quotient of said summed steady state Fourier component signal and said sensed static pressure signal;
raising said ratio signal to the two-seventh power and providing a two-seventh root signal indicative of the magnitude thereof;
multiplying the magnitude of said sensed static temperature signal by the magnitude of said Fourier series first harmonic resultant signal and providing a product signal having a magnitude indicative thereof;
dividing the magnitude of said product signal by the magnitude of said steady state Fourier series component signal and providing a quotient signal having a magnitude indicative thereof; and
multiplying the magnitude of said quotient signal by a constant signal magnitude and by said two-sevenths root signal and providing said airspeed signal having a magnitude indicative of the aircraft's velocity relative to the air mass.

16. The method of claim 9, further comprising the step of correcting said Fourier series first harmonic resultant signal by a factor of $[(m/\pi)\sin(\pi/m)]^2$ where m equals the number of said plurality of subrevolution intervals.

* * * * *